United States Patent
Edström

(10) Patent No.: US 7,635,006 B2
(45) Date of Patent: Dec. 22, 2009

(54) METHOD FOR SEALING AND/OR RECONDITIONING OF PIPES

(75) Inventor: Sten Edström, Gävle (SE)

(73) Assignee: Proline AB, Gävle (SE)

( * ) Notice: Subject to any disclaimer, the term of this patent is extended or adjusted under 35 U.S.C. 154(b) by 16 days.

(21) Appl. No.: 10/517,932

(22) PCT Filed: Jun. 13, 2003

(86) PCT No.: PCT/SE03/00994

§ 371 (c)(1),
(2), (4) Date: May 26, 2005

(87) PCT Pub. No.: WO04/001276

PCT Pub. Date: Dec. 31, 2003

(65) Prior Publication Data

US 2005/0229987 A1 Oct. 20, 2005

(30) Foreign Application Priority Data

Jun. 20, 2002 (SE) .................................. 0201889

(51) Int. Cl.
*F16L 55/16* (2006.01)
(52) U.S. Cl. .................... 138/98; 138/97; 405/150.1; 405/184.1; 405/184.2
(58) Field of Classification Search ............... 138/97, 138/98; 405/150.1, 184.2, 184.1
See application file for complete search history.

(56) References Cited

U.S. PATENT DOCUMENTS

| | | | |
|---|---|---|---|
| 3,753,766 A * | 8/1973 | Brown et al. ............... 138/97 |
| 3,894,328 A * | 7/1975 | Jansson ..................... 29/451 |
| 3,960,644 A | 6/1976 | McFadden |
| 4,207,130 A * | 6/1980 | Barber ................. 156/244.13 |
| 4,347,018 A * | 8/1982 | Wrightson et al. ....... 405/150.1 |
| 4,773,450 A * | 9/1988 | Stanley ....................... 138/98 |
| 4,861,634 A * | 8/1989 | Renaud ................... 428/36.1 |
| 5,049,003 A * | 9/1991 | Barton .................. 405/184.1 |
| 5,186,215 A | 2/1993 | Gilleland |
| 5,285,817 A * | 2/1994 | Sigel ......................... 138/97 |
| 5,334,429 A * | 8/1994 | Imoto et al. ............. 428/36.2 |
| 5,423,630 A * | 6/1995 | Imoto et al. ............ 405/184.2 |
| 5,656,117 A * | 8/1997 | Wood et al. ............... 156/287 |
| 6,240,965 B1 * | 6/2001 | Maimets ..................... 138/98 |
| 6,360,780 B1 * | 3/2002 | Adolphs et al. ............. 138/98 |
| 6,516,506 B2 * | 2/2003 | Donnelly et al. ............ 29/451 |

(Continued)

FOREIGN PATENT DOCUMENTS

| NL | 8204847 | 7/1984 |
| SE | 343357 | 3/1972 |
| SE | 458950 | 5/1989 |
| SE | 504663 | 3/1997 |

*Primary Examiner*—James F Hook
(74) *Attorney, Agent, or Firm*—Notaro & Michalos P.C.

(57) ABSTRACT

In a method for sealing and/or reconditioning of pipes through spraying a fluid coating material towards the inner wall of the pipe at least one material piece divided in the longitudinal direction thereof held together under pretension to a pipe piece with an outer diameter being less than the inner diameter of the pipe is before the spraying introduced into the pipe to a location for a substantial hole in the pipe wall for covering the hole. The mechanisms for holding it together is then broken so that the pipe piece will bear under pretension against the inner wall of the pipe and form an auxiliary wall over the hole retaining the material sprayed inside the pipe.

17 Claims, 3 Drawing Sheets

U.S. PATENT DOCUMENTS 6,703,091 B1 * 3/2004 Walker ...................... 428/34.5
6,723,266 B1 * 4/2004 Lippiatt ................ 264/173.17
6,755,592 B2 * 6/2004 Janssen ................... 405/184.1

* cited by examiner

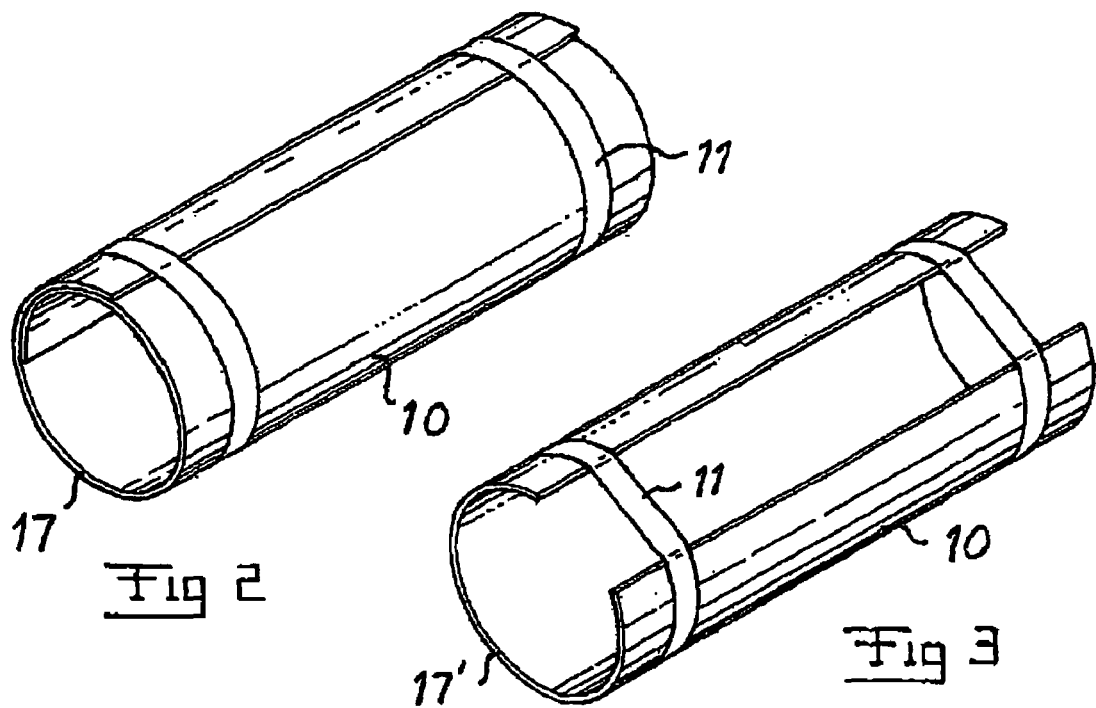
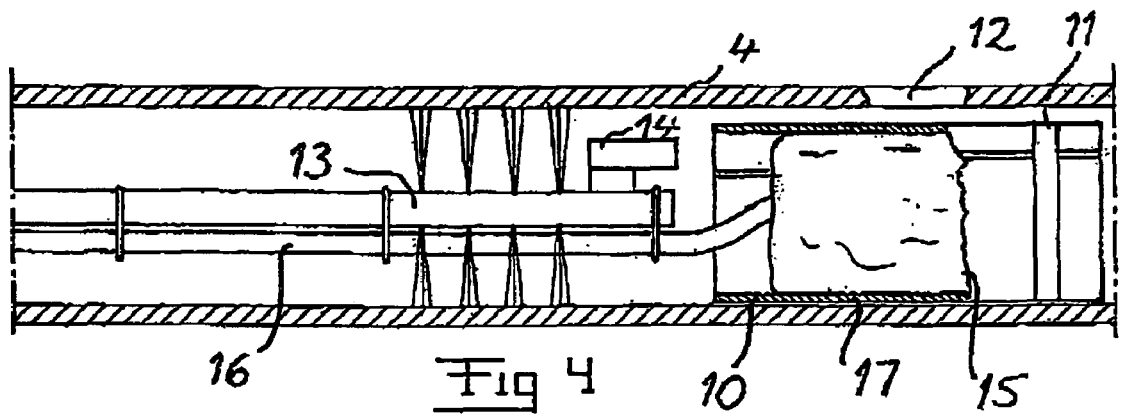
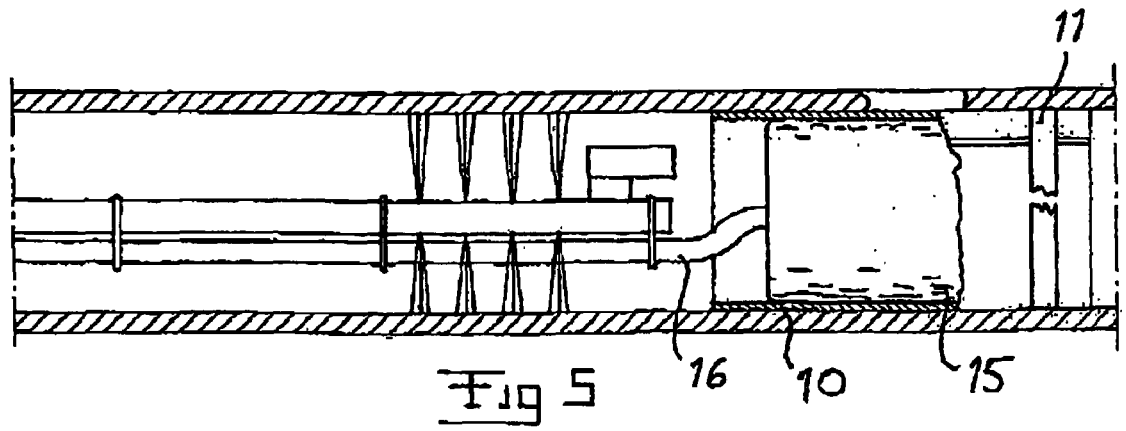

METHOD FOR SEALING AND/OR RECONDITIONING OF PIPES

FIELD OF THE INVENTION AND PRIOR ART

The present invention relates to a method for sealing and/or reconditioning of pipes inaccessible from the outside due to location thereof inside building elements, in the ground or the like according to the preamble of appended claim 1 as well as a member associated with such a method.

Such a method may be used for internally coating all types of pipes, such as for example "water pipes", which comprise all types of pipes conducting water, also waste water and discharge pipes, larger main pipes in the soil or ground as well as pipes in the heating, water and sanitation system of accommodations, and ventilating pipes for ventilating buildings. The condition of pipes of this type is impaired with age, and for example rust in pipes of cast iron tends to create holes in the walls thereof at certain exposed locations, which may lead to leakage having sometimes severe consequences, such as costly moisture damages in buildings, leakage of substances being harmful to the environment into the ground and so on. Also pipes of plastic change with time and fissures therein may arise as a consequence of ageing. There is therefore a need to recondition such pipes after a certain period of time through an internal coating thereof with a protecting layer, so that holes or fissures in the pipes resulting in damages of the environment will never appear.

A number of methods of this type are therefore known, in which any type of slide or carriage, which is usually pulled through a pipe to be reconditioned while spraying coating material onto the inner wall of the pipe through a nozzle arranged at the slide or the carriage, is utilized.

A method of this type is already known through for example the applicant's Swedish patent 9502330-5. Although the method described therein functions well it is desired to enlarge the field of use thereof, since it may not be used for sealing and/or reconditioning of pipe portions having substantial holes through the pipe wall. The expression substantial holes means here usually a diameter of the hole exceeding at least 2 mm, usually at least 10 mm. "Diameter" is here to be interpreted as a circle with this diameter which may be placed within the hole, which may accordingly for example be a longitudinal slot, but it will then at some location allow the introduction of a circle having a diameter of at least said size.

Should a method of this type described in this Swedish patent be used where such substantial holes are present, there is a high risk that the hole in question is not filled in a satisfying way or not at all, and that the material sprayed out penetrates through the hole out of the pipe and in between building elements, out in the soil or the like. Therefor, when sealing and/or reconditioning of pipes with such great defects in the form of substantial holes, it was until now necessary to either push a completely new pipe into the defect pipe or locally, where the holes are present, break up walls, dig into the ground or the like so as to plug up the hole or the holes from the outside, and a said method may then be used, when the pipe no longer have any such substantial holes.

SUMMARY OF THE INVENTION

The object of the present invention is to provide a method of the type defined in the introduction, which is adapted to be used also for sealing and/or reconditioning of pipes having one or more substantial holes through the pipe wall, so that the field of use of such a method may be expanded.

This object is according to the invention obtained by providing a method according to the appended claim 1.

By using a pipe piece designed in this way in the form of a material piece divided in the longitudinal direction thereof so as to in this way cover the hole after breaking the means for holding it together an internal auxiliary wall without any ability of its own to seal the hole is created exactly where the hole is located, so that spraying of the coating material inside the pipe may then take place with the same good result as if the hole was not there.

It is pointed out that a number of methods are already known, which at first sight seem to be closely related to the method according to the invention, but these methods are of a fundamentally different type. Thus, it is described in WO 87/03840, SE 368 435 and in U.S. Pat. No. 5,186,215 how pipes are sealed by introducing flexible pipes thereinto, which are held together during the introduction, so that they have a smaller outer diameter than the inner diameter of the receiving pipe, and the member holding them together being intended to then be broken, so that they get an outer diameter when introduced in the pipe substantially corresponding to the inner diameter of the receiving pipe. The reconditioning is completed through the introduction of these pipes into the pipes to be reconditioned. Thus, the means holding the members together is utilized for facilitating the introduction of a new pipe into an old pipe. No reconditioning of the pipes through spraying coating material on the inner walls takes place in these methods, and the pipes introduced are alone able to achieve sealing of possible holes in the outer pipe. A use of a material piece divided in the longitudinal direction and adapted to be applied over a hole in a tube under pretension so as to function as an auxiliary wall when spraying coating material on internal walls in a pipe is accordingly something totally new and is not even mentioned in said publications.

According to a preferred embodiment of the invention a camera is introduced into the pipe together with the pipe piece and the location at which the means holding the pipe piece together under pretension shall be broken is determined on the basis of pictures of the interior of the pipe displayed by the camera. It may hereby be ensured that the pipe piece is applied as a said auxiliary wall exactly at the location where it is desired and needed.

According to another preferred embodiment of the invention a bellow-like member expandable through supply of a pressurized medium thereto is brought to expand inside said pipe piece when reaching said location for the substantial hole for breaking said means for holding the pipe piece together. This constitutes a simple and reliable way to break said means without any risk of damaging the material piece or the pipe wall. A bellow-like member in the form of a rubber bellow may advantageously be brought to expand through supply of pressurized air thereto for breaking said means.

According to another embodiment of the invention, which constitutes a further development of the two preceding embodiments, the pipe piece is moved inside the pipe towards said location while holding it through a partially expanded bellow-like member located thereinside, which is brought to expand further when reaching said location. The bellow-like member may hereby be used both for holding the pipe piece during the movement thereof for bringing it to said location and for breaking the means for holding it together.

According to another preferred embodiment of the invention a said pipe piece having a material thickness being less than half the thickness of the wall of the pipe is introduced into the pipe to said location. The pipe piece may advantageously have a material thickness being less than a third of the wall thickness of the pipe, since the material piece forming the pipe piece is only intended to function as an auxiliary wall retaining the coating material sprayed and not to in any way seal or recondition the pipe by itself.

According to another preferred embodiment of the invention a said pipe piece having a material thickness of 0.2-2 mm, advantageously 0.8-1.4 mm and preferably about 1 mm, is introduced into the pipe to said location. Thus, very thin material pieces having themselves no ability to function as a pipe wall may be used for forming said auxiliary wall. This is also advantageous by the fact that the reduction of the inner diameter of the pipe as a consequence of the application of the material piece will not be substantial, so that after internal spraying of the pipe with coating material it will hardly be apprehended that said material piece is locally arranged under the coating material.

According to another preferred embodiment of the invention a said pipe piece is made of glass fibre reinforced polyester introduced into the pipe to said location. It has turned out that such a material is advantageous, since the material piece may be made thin, but at the same time durable and be pretensioned so as to then assume a resting position involving also a pretension against the pipe wall after breaking the means for holding it together.

According to another preferred embodiment of the invention it is a pipe piece that in a state applied over a said substantial hole after breaking the means for holding it together surroundingly covers the inner wall of the pipe that is used, which is advantageous, since it is only necessary when introducing the pipe piece in the pipe to check that it is introduced as far as desired into the pipe, and it does not matter if the pipe piece is turned during the introduction. However, it may sometimes be suitable to use a pipe piece of another type, and this is mentioned in a further preferred embodiment of the invention, in which a said pipe piece, which in a state applied over said substantial hole after breaking said means for holding it together has a longitudinal gap between the two circumferential ends thereof with a transversal dimension smaller than half the circumference of the pipe that is used for enabling sealing of at least one said substantial hole located opposite to a so-called T-branch of the pipe. When such T-branches or the like are present in the pipe, i.e. where another pipe opens into said pipe, a pipe piece surroundingly covering of the wall of the pipe may for sure not be used, since this would obstruct the opening to the other pipe.

According to another preferred embodiment of the invention the pipe piece is moved inside the pipe to a location for covering a hole having a diameter exceeding 2 mm, exceeding 10 mm or exceeding 20 mm. Thus, the method according to the invention may be efficiently utilized for sealing and/or reconditioning of pipes through internal spraying also when very big holes through the pipe wall exist.

The invention also relates to a member adapted to be used for forming an auxiliary wall when internally spraying a pipe inaccessible from the outside due to location in building elements, in the ground or the like with coating material as well as a method for application of an auxiliary wall over a substantial hole in a pipe inaccessible from the outside due to location in a building element, in the ground or the like according to the two appended independent claims for such a member and such a device, respectively.

The advantages of such a member and such a device appear without any doubt from the discussion above of the method according to the invention and the preferred embodiments thereof.

Further advantages as well as advantageous features of the invention appear from the following description and the other dependent claims.

BRIEF DESCRIPTION OF THE DRAWINGS

With reference to the appended drawings, below follows a specific description of preferred embodiments of the invention cited as examples. In the drawings:

FIGS. 2 and 3 are perspective views illustrating a member according to the invention in the form of a material piece divided in the longitudinal direction thereof, which is held together under pretension to a pipe piece according to two preferred embodiments of the invention, FIG. 4 schematically illustrates a device according to the invention for applying an auxiliary wall at a location in a position for introducing a pipe piece later forming the auxiliary wall, FIG. 5 is a view corresponding to FIG. 4 of the device in a position in which the pipe piece has been converted into an auxiliary wall in a location over a substantial hole in the pipe wall.

DETAILED DESCRIPTION OF PREFERRED EMBODIMENTS OF THE INVENTION

Figure 1:
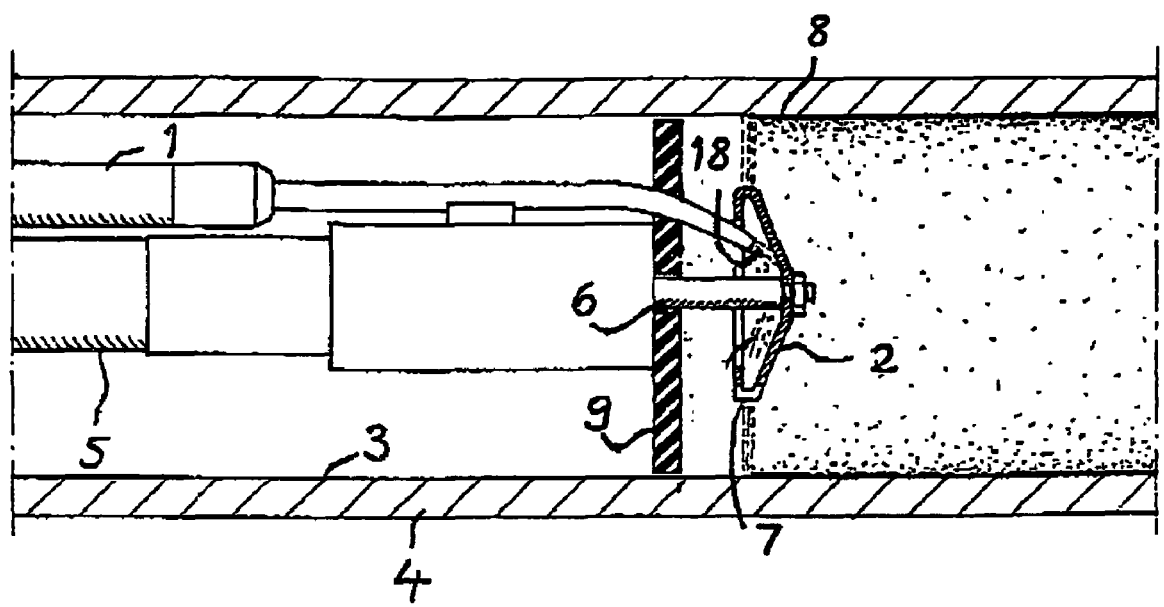
FIG. 1 is a partially sectioned view illustrating how a pipe may be internally coated through spraying according to a method of the type according to the invention.

How a device of the type already known through the Swedish patent 9502330-5 of the applicant may be used for carrying out a method of the type according to the present invention is illustrated in FIG. 1. This device has a member 1 in the form of a hose for feeding a coating material, for example polyester, in which glass flakes have been mixed, through a nozzle 2, from which it is intended to be sprayed out on the inner wall 3 in a pipe 4. The device has means not shown adapted to rotate a cable-like member 5, so that a part 6 rigidly connected with respect to rotation to the nozzle and arranged at the end of said member may be rotated. By such a rotation of the nozzle, preferably with a high speed, which exceeds 4000 revolutions/min and preferably is between 6000 and 8000 revolutions/min and pulling the nozzle 2 rearwards through a pipe this may by throwing of coating material 18 out through openings 7 arranged radially in the nozzle be coated by a coating material layer 8 for reconditioning and sealing of the pipe through forming an inner strong pipe wall as soon as the coating material has hardened. Furthermore, it is schematically illustrated in FIG. 1 how the device has a member 9 for centering the nozzle in a pipe, in which it is moved, so that the rotation axis of the nozzle will substantially coincide with the centre axis of the pipe.

Even if the method described in the Swedish patent mentioned above and schematically illustrated in FIG. 1 leads to a good result, it has the drawback mentioned above that it may not be used where substantial holes of the type defined above exist through the pipe wall, or if it is then used there is a risk that it results in inconveniences. However, the method according to the present invention finds a remedy to these inconveniences.

In the method according to the invention a material piece 10 schematically illustrated in FIG. 2 is used for this sake, which has a thickness being considerably smaller than the typical wall thickness of the pipe into which it is intended to be introduced, for example 1 mm with respect to 3 mm, and which advantageously is made of glass fibre reinforced polyester, sheet or another material, which may be held together through means 11, here in the form of comparatively easily breakable ribbons, under pretension, i.e. while storing potential energy. The material piece is before the introduction into a pipe held together through said means 11 to a pipe piece 17 having an outer diameter being lower than the inner diameter of the pipe into which it is to be introduced.

Figure 6:
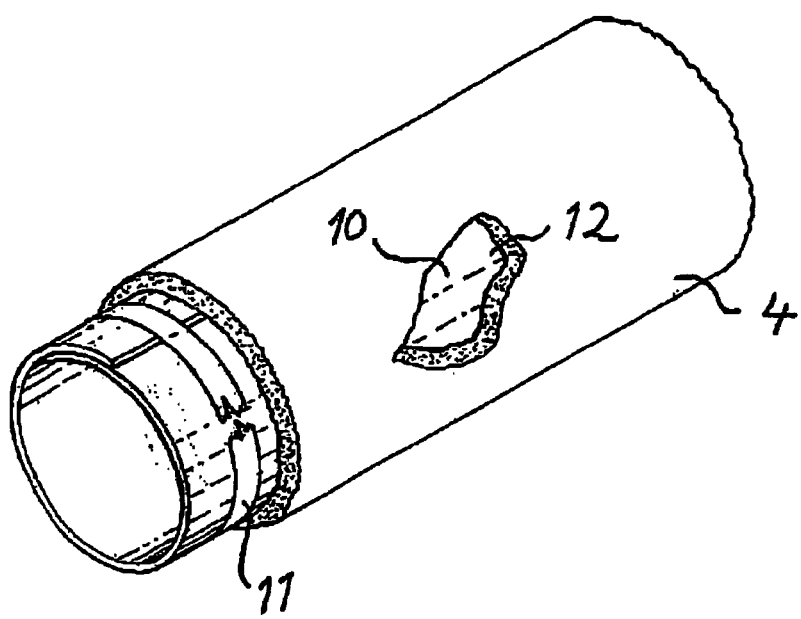
FIG. 6 is a partially sectioned perspective view illustrating how a member according to FIG. 2 is applied inside a pipe for functioning as an auxiliary wall over a hole when internally spraying coating material on the inner wall of the pipe.

A device for application of an auxiliary wall over a substantial hole 12 in a pipe 4 inaccessible from the outside due to location in a building element, in the ground or the like, is schematically illustrated in FIG. 4. The device comprises on a frame 13 adapted to be pushed into a pipe a camera 14 adapted to display pictures of the interior of the pipe, a bellow-like member 15 connected to the frame and through a conduit 16 to a source of a pressurized medium not shown. The bellow-like member is adapted to be expanded through supply of pressurized medium thereto and is for this sake of for example rubber. It is illustrated in FIG. 4 that the bellow-like member is adapted to be partially expanded when the frame is moved so as to externally thereof hold a pipe piece according to FIGS. 2 and 3. When then the camera shows that the pipe piece is in the correct position for covering a substantial hole 12, the control member controls the source of pressurized medium to supply pressurized medium to the bellow-like member 15 for expansion thereof and breaking said means 11 for holding the member together, so that the material piece 10 is applied at that location as an auxiliary wall over the hole 12 and bears against the inner wall 3 of the pipe under pretension, as shown in FIG. 5. Pressurized medium, i.e. preferably compressed air, may then be drawn out of the bellow-like member 15, so that this contracts and may then together with the rest of the device be retracted out of the pipe while leaving the auxiliary wall formed by the material piece over the hole 12. It is schematically illustrated in FIG. 6 how a material piece according to FIG. 2 may be applied in a pipe 4 so as to internally cover a hole 12.

Figure 7:
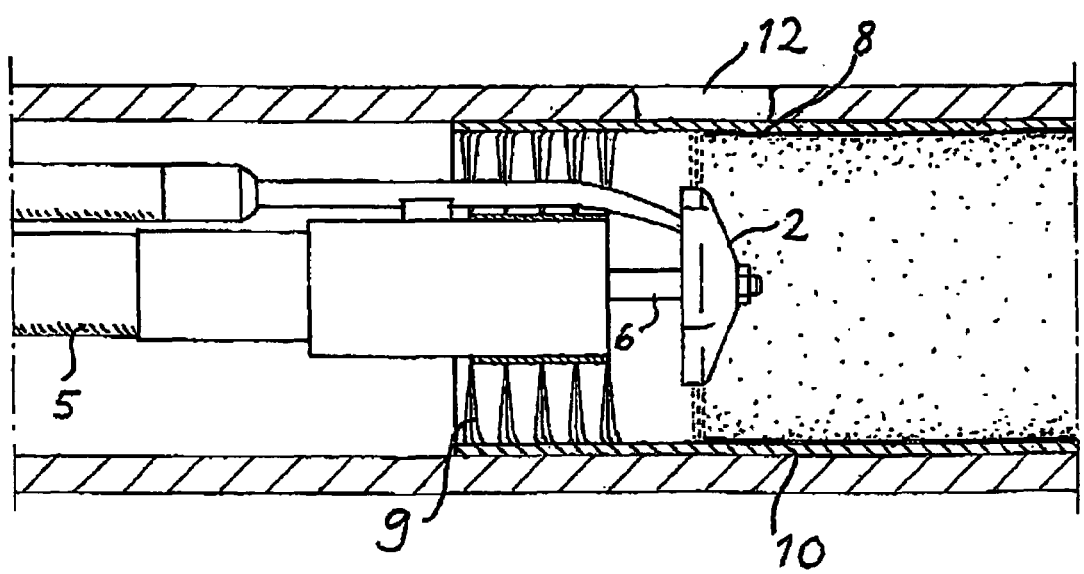
FIG. 7 is a view corresponding to FIG. 1 illustrating how internal spraying of a pipe wall takes place in the method according to the invention by utilizing a said auxiliary wall.

It is illustrated in FIG. 7 how the pipe 4 may then be internally coated with a coating material through rotation of a nozzle 2 of a device of the type illustrated in FIG. 1. When the nozzle reaches the location for the substantial hole the coating material will still be able to be efficiently retained inside the pipe and form a uniform coating layer 8 thereinside, so that the pipe is efficiently reconditioned and sealed by this coating layer, which will extend continuously through the pipe on both sides of the material piece 10.

A pipe piece 17' formed by a material piece 10 differing from the one according to FIG. 2 by being adapted to have a longitudinal slot between the two ends thereof as seen in the circumferential direction in a state applied over a hole with a transversal dimension being less than half the circumference of the pipe is illustrated in FIG. 3. This means that this material piece may be used for applying an auxiliary wall over a substantial hole in a pipe in the region of an opening of another pipe into this pipe, since it may be avoided that in such a case said second pipe is obstructed by the material piece.

The invention is of course not in any way restricted to the preferred embodiments described above but many possibilities to modifications thereof will be apparent to a person with skill in the art without departing from the basic idea of the invention as defined in the appended claims.

It would for example be possible to introduce one or more said material pieces into a pipe, for example about 10 such pieces distributed over the extension of the pipe, before starting the very spraying procedure.

It is pointed out that in the method according to the invention there is not at all any obligation to use a nozzle spraying coating material on the internal wall of a pipe through rotation, but the coating material could be sprayed on the inner wall of the pipe in an arbitrary way, for example by making a nozzle having an opening to carry out a scanning movement so as to coat the inner wall of the pipe, or by providing the nozzle with a number of small holes resulting in a fine spraying of the inner wall of the pipe without any need to rotate the nozzle when pulling the nozzle rearwards through the pipe.

It is pointed out that "control member" as used in the claims with respect to the control of the source of pressurized medium also comprises a control by hand by a person "turning up" the pressure when the position of the pipe piece is as desired.

It would as such be possible to break the action of the means for holding together by other members than an expandable bellow-like member, such as any form of knife or the like.

The invention claimed is:

1. A method for sealing of a pipe (4) that is inaccessible from the outside due to its location inside building elements or, that is in the ground, and in which a fluid coating material is sprayed out of at least one nozzle (2) moved through the pipe to be sealed, towards the inner wall (3) of the pipe for covering at least parts of the inner wall of the pipe thereof, and in which the coating material then hardens for forming a part of the wall of the pipe where it has been applied, and wherein the method is for sealing of pipes having one or more substantial holes (12) though the pipe wall, the method comprising:

introducing into the pipe to be sealed, prior to said spraying, at least one unperforated material piece (10) that is divided in the longitudinal direction thereof and held together by means (11) for holding the unperforated material piece (10) together to a form pipe piece (17, 17') with a smaller outer diameter than the inner diameter of the pipe, to a location of a substantial hole through the pipe wall for covering the hole;

after introducing the pipe piece (17, 17') into the pipe, to the location of the substantial hole through the pipe, then braking the means for holding the unperforated material piece together so that the pipe piece increases in diameter while releasing potential energy in the unperforated material piece to bear in direct contact against the inner wall of the pipe without coating material between the pipe piece and the pipe so that the unperforated material piece forming the pipe piece has no ability to seal said hole alone, but it forms in the subsequent spraying of the coating material an auxiliary wall in the same pipe as that in which the nozzle is located over the hole for retaining the material sprayed within the pipe, said material piece being introduced into the same pipe as that in which the nozzle is located, and said sprayed coating material being retained within the pipe in which the material piece is located; and after braking the means for holding the unperforated material piece together, using the nozzle (2) to spray the fluid coating material onto an inner surface of the pipe piece (17, 17') and onto the inner wall (3) of the pipe (4) adjacent the pipe piece not covered by the pipe piece, to form a coating material layer (8) on the inner surface of the pipe piece (17, 17') and the adjacent inner wall for sealing the auxiliary wall and the substantial hole (12) at said location.

2. A method according to claim 1, including introducing a camera into the pipe together with the pipe piece and that the location in which the means holding the pipe piece (17, 17') together under pretension is to be broken is determined on the basis of images of the interior of the pipe displayed by the camera.

3. A method according to claim 1, characterized in that a bellow-like member (15) expandable through supply of a pressurized medium is brought to expand inside said pipe piece (17, 17') when reaching said location for the substantial hole (12) for breaking said means (11) for holding it together.

4. A method according to claim 3, characterized in that it is a bellowlike member (15) in the form of a rubber bellow that is brought to expand through supply of compressed air thereto.

5. A method according to claim 3, characterized in that said pipe piece (17, 17') is moved inside the pipe towards said location while holding it through a bellow-like member (15) located thereinside and partially expanded, said member being brought to expand further when reaching said location.

6. A method according to claim 5, characterized in that said pipe piece (17, 17') having a material thickness being less than half the thickness of the wall of the pipe is introduced into the pipe to said location.

7. A method according to claim 1, characterized in that said pipe piece (17, 17') having a material thickness of 0.2-3 mm is introduced into the pipe to said location.

8. A method according to claim 7, characterized in that it is said pipe piece (17, 17') made of glass fibre reinforced polyester that is introduced into the pipe to said location.

9. A method according to claim 8, characterized in that it is said pipe piece (17, 17') made of sheet that is introduced into the pipe to said location.

10. A method according to claim 9, characterized in that it is a pipe piece (17), which in a state applied over said substantial hole (12) after breaking said means (11) for holding it together surroundingly covers the inner wall of the pipe, that is used.

11. A method according to claim 1, characterized in that it is said pipe piece (17'), which in a state applied over a said substantial hole (12) after breaking said means (11) for holding together has a longitudinal gap between the two circumferential ends thereof with a transversal dimension smaller than half the circumference of the pipe that is used for enabling sealing of at least one said substantial hole located opposite to a T-branch of the pipe.

12. A method according to claim 11, characterized in that it is one or more ribbons (11) of an easily breakable material that hold the pipe piece (17, 17') together when moving it to said location.

13. A method according to claim 12, characterized in that it is a coating material comprising a mixture of polyester and a hardening agent, preferably also glass flakes for obtaining a coating consisting of a glass flake reinforced polyester, that is sprayed on the inner wall of the pipe.

14. A method according to claim 1, wherein the coating material comprises a fire proof mass containing mineral wool that is sprayed on the inner wall of the pipe.

15. A method according to claim 14, characterized in that it is carried out for sealing of a waste pipe in a building.

16. A method according to claim 14, characterized in that it is carried out for sealing of a ventilating pipe in a building.

17. A method according to claim 1, characterized in that the pipe piece (17, 17') is moved in the pipe to a location for covering a hole (12) having a diameter exceeding 10 mm.

\* \* \* \* \*